United States Patent [19]

Buynak

Best Available Copy

[11] 4,190,835

[45] Feb. 26, 1980

[54] EDITING DISPLAY SYSTEM WITH DUAL CURSORS

[75] Inventor: William J. Buynak, Bayville, N.Y.

[73] Assignee: U.S. Philips Corporation, New York, N.Y.

[21] Appl. No.: 857,372

[22] Filed: Dec. 5, 1977

Related U.S. Application Data

[63] Continuation-in-part of Ser. No. 725,642, Sep. 22, 1976, abandoned.

[51] Int. Cl.[2] .......... G06F 3/14

[52] U.S. Cl. .......... 340/750; 340/706; 340/711; 340/724; 340/799

[58] Field of Search .......... 340/324 AD, 154, 711, 340/706, 799, 709, 724, 744, 750

[56] References Cited

U.S. PATENT DOCUMENTS

| | | | |
|---|---|---|---|
| 3,974,493 | 8/1976 | de Cavaignac et al. | 340/324 AD |
| 4,070,710 | 1/1978 | Sukonick et al. | 340/324 AD |
| 4,078,249 | 3/1978 | Lelke et al. | 340/324 AD |

*Primary Examiner*—Marshall M. Curtis

*Attorney, Agent, or Firm*—Thomas A. Briody; James J. Cannon, Jr.

[57] ABSTRACT

An editing display system using a CRT display, with variable margin and tabulation facilities. Dual cursors are provided on the display: the first indicating the row and column in the display selected by the user, the second "shadow" cursor appearing in the same column but on the rule indice line of the display. The dual cursor function is implemented by providing a random access memory which is partitioned into data sets in which the first character represents the location of a cursor on a given line, and the remaining characters identify the actual characters on that line. Direct memory access including fixed format information is used for transferring the data in memory to a shift register in the video control portion of the system.

4 Claims, 7 Drawing Figures

EDITING DISPLAY SYSTEM WITH DUAL CURSORS

REFERENCE TO RELATED APPLICATIONS

This is a continuation-in-part of U.S. patent application Ser. No. 725,642, filed Sept. 22, 1976, now abandoned.

BACKGROUND OF THE INVENTION

The invention relates to text-editing and character display systems, and more particularly stored controlled systems featuring dual cursors, and variable margin and tabulation facilities.

Text editing and character display (or "word processing") systems are well known in the prior art, as represented by U.S. Pat. Nos. 3,501,746; 3,579,193; 3,675,208 and 3,755,789. Such systems are characterized by complex machine architectures, are difficult to program, and do not have the flexibility required in commerical products.

Stored program and microprogrammable controllers are also known in the prior art, and U.S. Pat. No. 3,731,280 is hereby incorporated by reference to illustrate such a controller and provide more detailed disclosure of the digital logic circuitry used in the present invention.

The prior art text editing and character display systems were not simple to use because they lacked fixed rule lines on the display, and the variable margin and tabulation facilities were not simply implemented and apparent to the user.

SUMMARY OF THE INVENTION

It is an object of the invention to provide a text editing system with a visual display unit which displays fixed ruled lines defining the area upon which text may be written.

It is another object of the invention to provide a display system which simultaneously supplies at least two visible markers or cursors at predetermined locations on the display.

It is still another object of the invention to provide a video display of characters stored in a predetermined portion of memory, while substantially simultaneously displaying fixed margins and tab indicies on such display.

It is yet another object of the invention to provide a text processor having a random access memory in which the cursor locations corresponding to the line to be displayed are stored in a first portion of the random access memory, a character representing the rule line stored in a second portion of the random access memory, and the text stored in a third portion of said random access memory, and the character representing the right hand rule line stored in yet a fourth area of the random access memory.

The present invention provides an editing display system including a random access memory which is partitioned into data sets corresponding to each line of the display. Each data set is partitioned into five data portions. The first portion represents the location on that line where a cursor is to be activated. The second portion is a character representing a vertical rule line which is to be displayed on the left most portion of the display. The third portion is a region where either text or blank characters may be automatically introduced by the stored program controller. If the stored program controller is set to define a specific margin or tabulation point, a predetermined number of blank positions would be inserted into the third portion of the data set. Text entered by the user for display will then be entered in the adjacent fourth portion of the random access memory. Since each data set has a fixed number of bits or characters, the last character represents the right-hand border or rule line display. The right hand most border or rule line display is again programmed by the stored program controller at a specific number of bits or characters from the first character of the data set.

DESCRIPTION OF THE PREFERRED EMBODIMENTS

Figure 1:
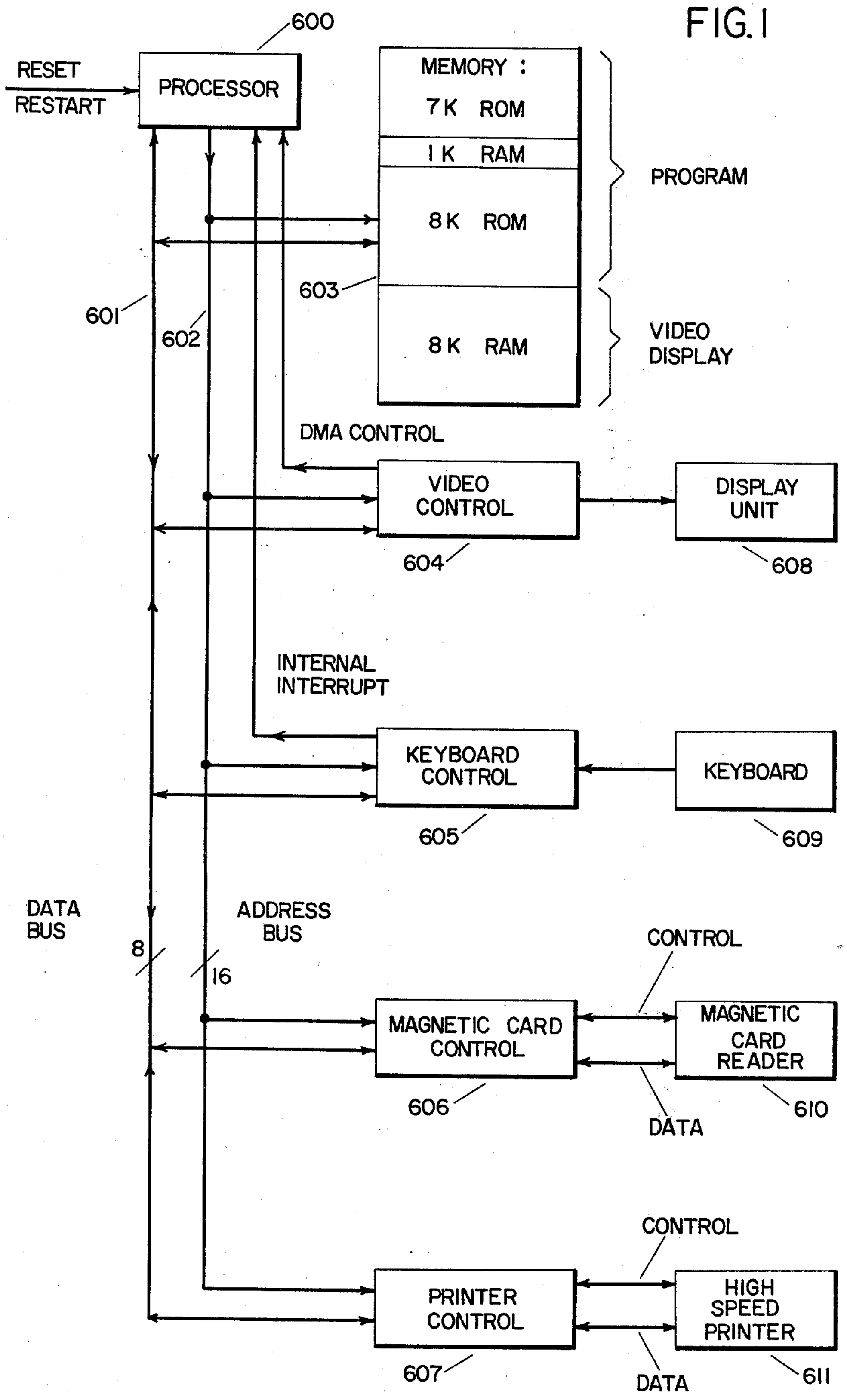
FIG. 1 is a highly simplified block diagram of the first embodiment of an editing display system according to the present invention.

FIG. 1 is a highly simplified block diagram of a first embodiment of an editing system according to the present invention. The system includes a processor 600 which is connected to 8 bit data bus 601, and a 16 bit address bus 602. The data bus 601 and address bus 602 are also connected to a memory 603, a video control unit 604, a keyboard control unit 605 a magnetic card control unit 606, and a printer control unit 607.

As shown in FIG. 1, the memory consists of both read only memory (ROM) and random access memory RAM). The memory is also shown to be divided into program and video display portions. The program portion consists of 7 K bytes of ROM, 1 K bytes of RAM, and 8 to 16 K bytes of additional program ROM. The video display portion consists of 8 K of RAM.

The video control unit 604 is connected to a display unit 608, such as a CRT video monitor (e.g., Motorola M4600). The keyboard control unit 605 is in turn connection to a keyboard 609 of conventional configuration illustrated in more detailed in FIG. 7. The magnetic card control unit 606 is connected to a magnetic card reader 610, again of conventional configuration, by both control and data lines. Finally, the printer control unit 607 is connected to a high speed printer 611, again of conventional design, by control and data lines.

The processor 600 used in the present invention is a microprogrammed solid state digital computer designed primarily for input/output operations, such as controlling a printer and CRT display. While the invention has been illustrated and described as embodied in a microprogrammed computer, it is not intended to be limited to the use of such computer, since implementation in other types of hardwired or stored programmed data processing systems can be made without departing from the intent of the present invention.

The microprogrammed computer or controller according to the present invention is a single address, 16-bit computer using two's complement arithmetic and is based upon the controller described in U.S. Pat. No. 3,731,280 incorporated by reference above.

The memory 603 is organized in 16-bit words. Each memory bank has a capacity of 4096 16-bit words. Two 8K ×8 memory units are used to construct each bank, which facilitates the retrieval or storage of either the most significant byte or the least significant byte, the other byte being left in memory unchanged. Each instruction of the processor is two bytes (one in the upper half of the memory bank, the other in the lower half); any 16-bit instruction or data word can be accessed by a 12-bit address that is supplied simultaneously to the memory units of both banks. The execution of processor instructions requires 2 microseconds for the "fetch" sequence and between 1 and 4 microseconds for the "execute" sequence; the average execution time for instructions other than Shift or Rotate is 3 microseconds. A single interrupt channel is provided from the keyboard control unit 605. When an interrupt request is granted; control is transferred to a predetermined memory location, where a servicing routine identifies the interrupting device and takes the required action. The processor also has a "direct memory access" (DMA) control facility which enables the video control unit 604 to directly access memory without processor intervention or interference. The DMA facility will be explained in more detail later. Finally, the processor is equipped with a "reset" or "restart" facility, as is conventional in many stored program systems.

Figure 2:
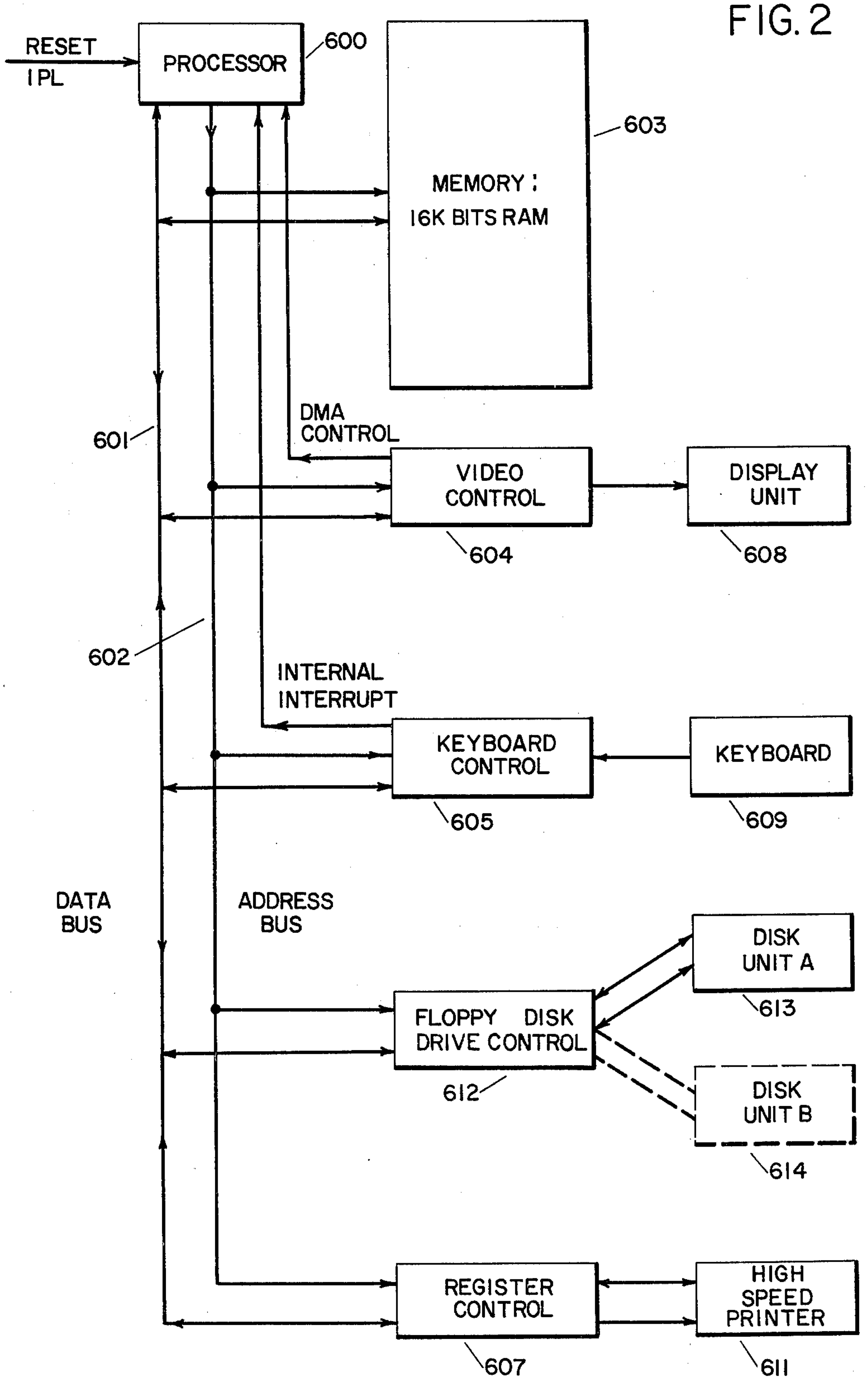
FIG. 2 is a highly simplified block diagram of a second embodiment of an editing display system according to the present invention.

FIG. 2 illustrates a second embodiment of the present invention in which the magnetic card reader 610 has been replaced by one or two floppy disk units 613 and 614. The floppy disk unit is controlled by a floppy disk drive control 612 of conventional design. Floppy disk control units and disk units are well known in the art, as exemplified by the Shugart Model 801.

Figure 3:
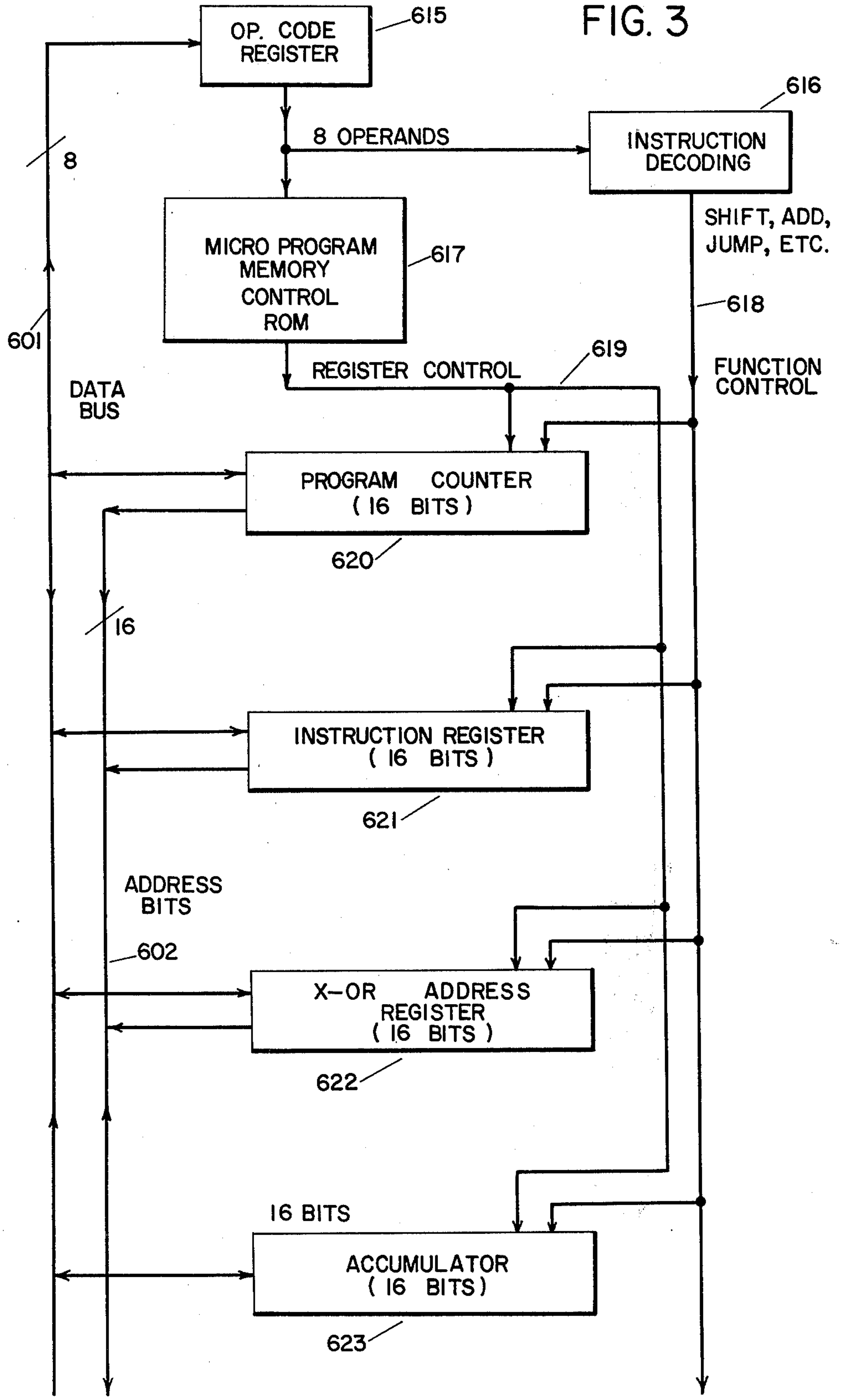
FIG. 3 is a highly simplified block diagram of a microprogrammed processor for use in an editing display system according to the present invention.

FIG. 3 is a highly simplified block diagram of a microprogrammed processor which can be used with the present invention. The components shown in FIG. 3 include an operation code register 615 which stores the instruction to be executed. The register 615 is connected to both an instruction decoding unit 616 and the microprogram memory or control ROM 617. The instruction decoding unit 616 performs the task of function control, that is, designating the particular function to be performed by the processor such as shift, add, jump and so on. Such a designation is implemented by sending appropriate signals along a function control line 618 at precisely predetermined times. The microprogram memory or control ROM 617 performs the function of register control, and appropriate register control signals are then sent along the register control bus 619 at corresponding times indicating the specific registers to which the various functions specified on the function control line 618 are going to be applied. Four such registers are shown in FIG. 3 connected to the data bus 601, and the address bus 602, the register control line 619, and the function control line 618. These registers are designated the program counter 620, the instruction register 621, the X or "address" register 622, and the accumulator 623. The memory system is organized in 16-bit words.

The 8-bit data bus 601, and a 16-bit address bus 602 are the focal point for the transfer of all data within the processor. As described in the above-noted U.S. Pat. No. 3,731,280 the bus includes a plurality of multiplexers which are designed to receive a multi-bit input code for either inhibiting multiplexer action or for selecting those components of the controller which are to receive data from or pass data to the bus mutliplexer.

The bus channel selection signals are derived from the sequence of instructions and individual instructions cycles. Reference is again made to the disclosure of U.S. Pat. No. 3,731,280 for a detailed operational description of a processor which could be used with the present invention.

Figure 4:
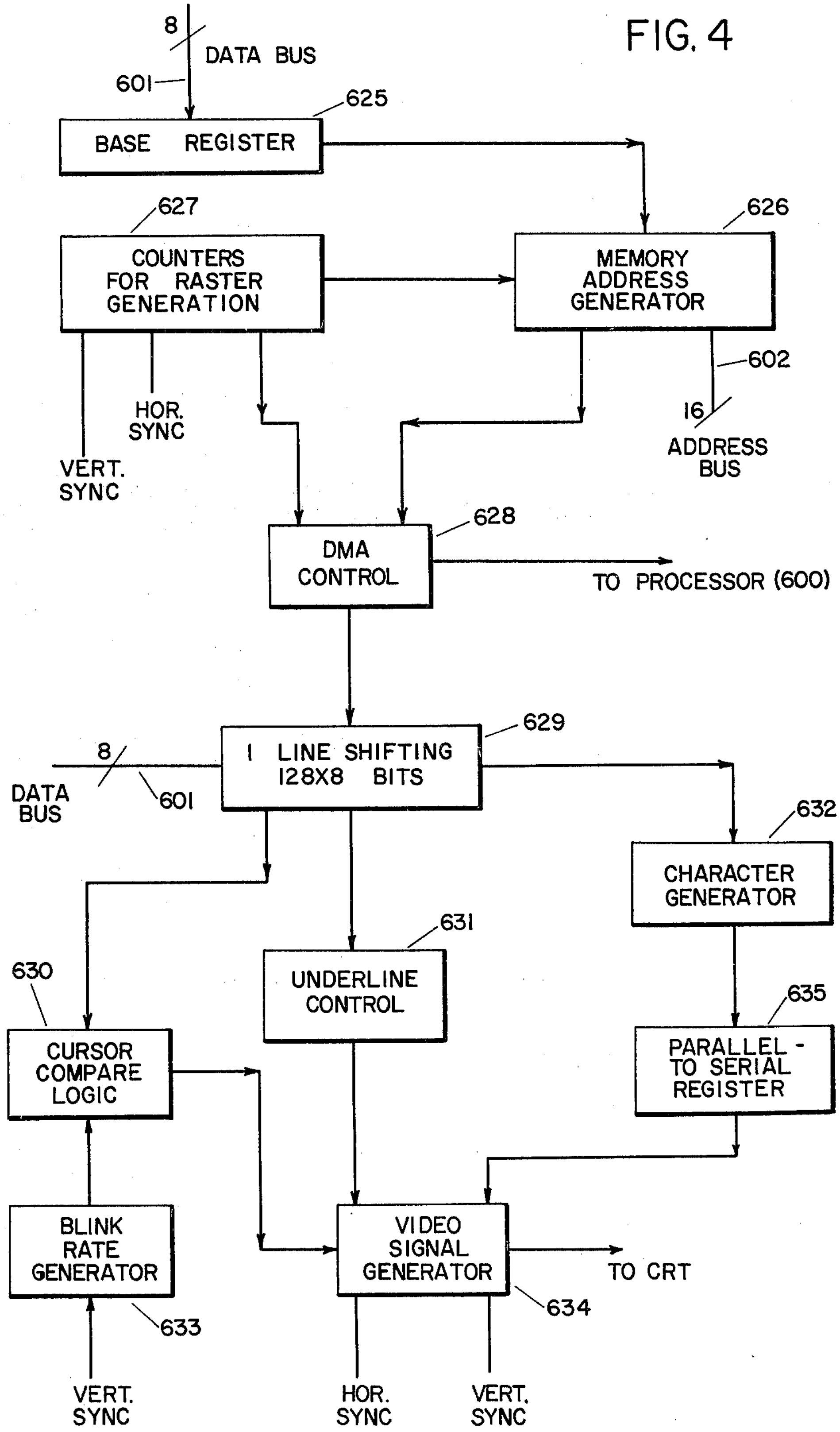
FIG. 4 is a highly simplified block diagram of the video interface logic circuitry and direct memory access control interface circuitry according to the present invention.

FIG. 4 is a highly simplified block diagram of the video interface or control circuit 604 shown in FIG. 1. As suggested in FIG. 1, the data for display on the CRT screen of the display unit 608 is stored in the randomaccess video display memory portion of the memory 603. The specific characters to be displayed are supplied from the memory 603 over the data BUS 601 to the "one line" shift register 629 shown in FIG. 4. The shift register 629 is shifted by a conventional timing system (not shown) which also controls the video signal generator. Each character is typically represented by eight bits. In one embodiment, the first seven bits are used to designate the character. The eighth-bit of each character is an underline control bit. If the eighth-bit of a character is a one, the underline control unit 631 is activated to provide an underline under that character on the CRT display. This is done by detecting the eighth-bit in a latch (not shown) which is coupled to the one line shift register 629. The eighth-bit signal is then sent to a D-type positive edge triggered flip flop, such as the 7474. (The numerals here and used hereinafter designate certain types of standard TTL integrated circuits of the 7400 series which are available from numerous vendors and are well known to those skilled in the art). Information on the D input of the flip flop is transferred to the Q output on the positive going edge of the clock pulse. The Q output of the flip flop is applied to a three-input NAND-gate, such as a 7410. The underline output together with the output of the shift register 629, is applied to the character generator 632. The character generator 632 consists of two programmed ROMS (such as the Intel 2708) which generate the appropriate character in a 7×11 matrix, as is conventional.

The output of the ROM character generators 632 are in parallel form and are applied to a parallel-to-serial register 635 (such as the 74166 8-bit shift register). The output of the parallel-to-serial register 635 is in turn applied to the video signal generator 634. The video generator 634 essentially consists of a 7400 OR-gate to which the horizontal sync and vertical sync lines are connected. As indicated in FIG. 4, the inputs to the video signal generator cmprise the cursor compare logic 630, the underline control 631, and the parallel-to-serial register 635. These inputs are added together (i.e., ORed) to form a single composite signal which constitutes the video output which is applied to the CRT display unit 608.

The video system operates with the processor under direct memory access (DMA) control. Direct memory access means that when the processor is stopped, data can be transferred "directly" from the memory to the shift register 629. In the present configuration, the processor is stopped about 1/6 of the time. During that time interval (about 256 μsec.) a single "line" of data (128×8 bits) is transferred. During the other time intervals, the processor is operative to decode functions indicated on the keyboard by the user, and perform operations on data (i.e., text) stored in memory.

The video interface circuit also contains the logic necessary for generating a cursor on the CRT. The cursor is produced by the cursor compare logic unit 630, which consists of a register for holding the cursor location (such as a 7475 quad bi-stable latch) having an output connected with a comparator (such as the 9324). The fixed position of the cursor is continually compared with the instantaneous position of the beam, and when a "verify" signal is produced, the cursor logic is activated.

The technique for generating the display cursors according to the present invention differs from that in the prior art, such as IBM Technical Disclosure Bulletin 18, 974–75 (1975). In that reference, the cursor location is specified by a distinct cursor register (4). When a cursor is desired to be displayed with respect to a character a predetermined bit position of that character is set to 1.

This is distinguished from the present invention, in which a single cursor position is specified in each line. Thus, the present invention is limited to a single cursor in a line, while the IBM reference may have a cursor associated with each character in a line.

Both the present invention and the IBM article illustrate dual cursors. In the present invention, the cursor location specified by the user in a line of text is repeated in the second line of the display. The first line of the display is fixed and predetermined by a specially coded sequence of memory locations which reads out to provide characters recognizable as margin and tab indices. The user specification is done automatically by software which inserts the same cursor position location in the first character position of the second line of the display; and in the line of text with the visible cursor. In IBM, the dual cursor is merely a "shadow" cursor, slightly above and to the right of the cursored character.

It should further be pointed out that the IBM cursor is an underscore-cursor, whereas the cursor according to the present invention is by character-display inversion (i.e., blinking between the displayed character against a dark background, and the "negative" character against a light background).

Figure 5:
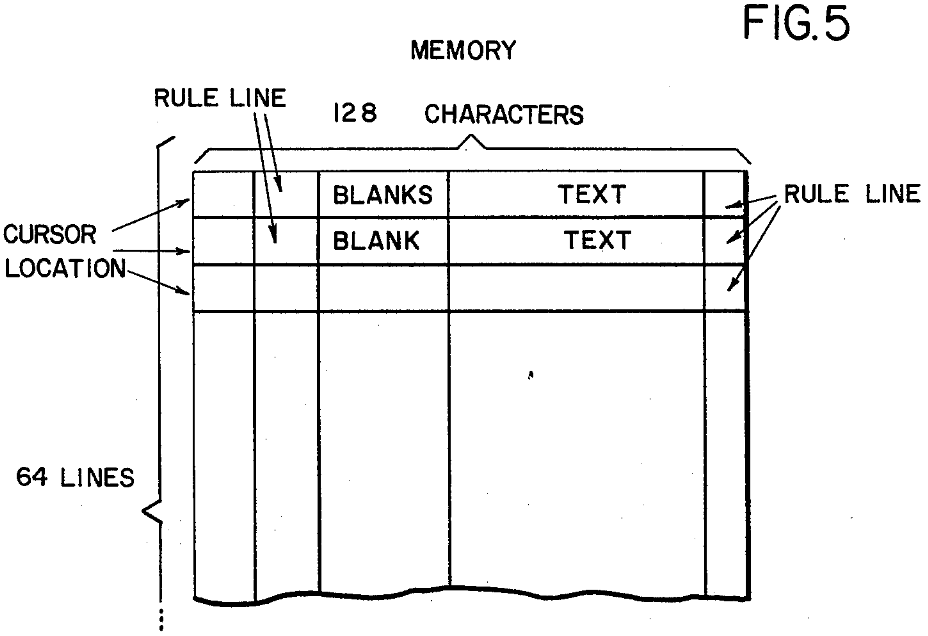
FIG. 5 is a highly simplified representation or memory map of the video display random access memory of an editing display system according to the present invention.

FIG. 5 is a memory map indicating the sequential contents of the video display memory represented in the memory block 603 shown in FIG. 1. The 8K random access video display memory is shown as being represented as 64 lines each consisting of 128 characters. FIG. 5 is therefore only meant to be illustrative of the storage in the 8K RAM, and is not meant to depict the actual organization within the solid state component. In the present system each character is represented by 8 bits and is encoded in ASCII. In the present embodiment shown in FIG. 5 there are 64 lines for display, and each "line" has up to 128 characters to be displayed. The CRT screen itself can only display 100 characters on a line at a time. By defining at which point on the line the user wishes to begin the display on the CRT, the user has the ability to indicate which 100 sequential characters of the 128 characters in total will be displayed on the CRT and therefore visible to the user. The user does this by softward control which specifies the base address which is applied to the base register 625 of the video interface circuit. The base register 625 is connected to the memory address register 626 as shown in FIG. 4. The memory address generator points to the specific character in the line in question at which the display is to begin. Under direct memory access control 628 the processor then transfers over the data bus 601 the specific character to be displayed into the one line shift register 629.

Figure 6:
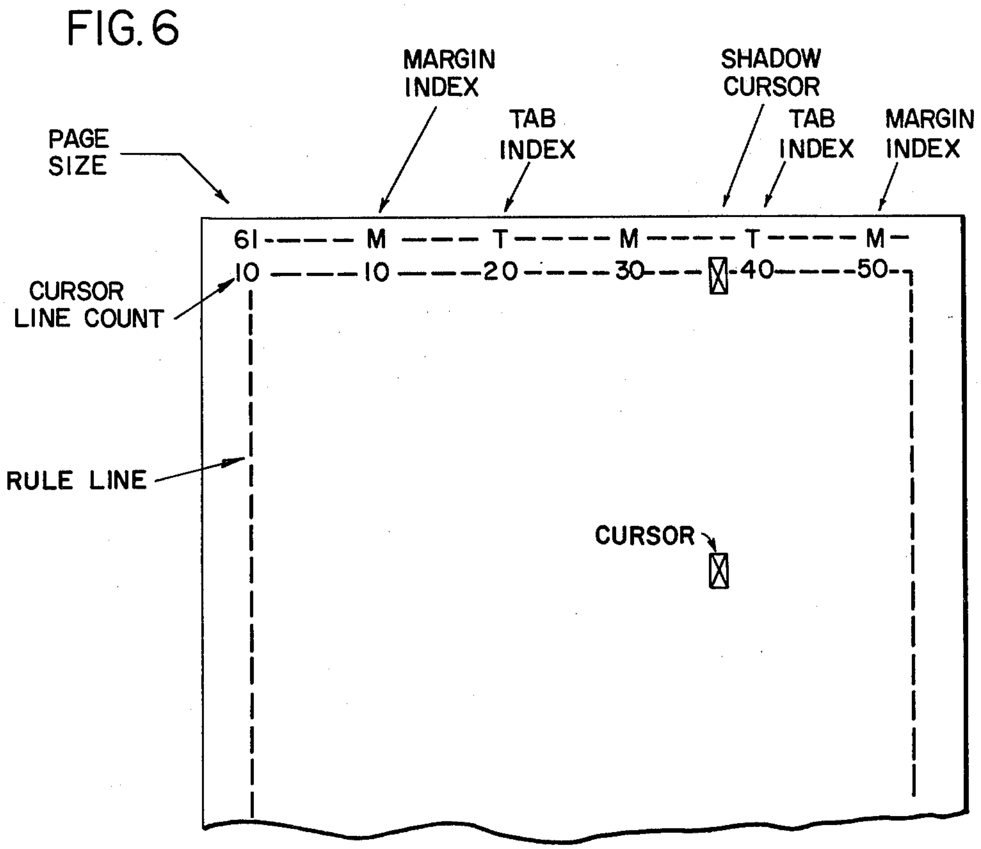
FIG. 6 is a highly simplified representation of the image provided by the present invention on a CRT screen or display unit.

The information stored in the lines in memory shown in FIG. 5 can now be described in greater detail. The first character of the 128 characters on each line in the memory is used to define the location of the cursor on that line. Since every line has a first character which is used to define the cursor location, each line necessarily has a cursor. However, since only 100 characters are displayed on the CRT screen, the cursors for each of the 64 lines are not necessarily simultaneously displayed on the CRT screen. In fact the typical situation is that only one cursor is displayed within the text portion of the display which designates the location in memory which is presently being accessed by the user for entering and displaying text on the display and into or from the memory. FIG. 6 is a highly simplified diagram of the CRT display. The rectangular box with an X inside it in the lower right hand portion of the display represents the text cursor. The location of this cursor is only represented in the upper left hand portion of the display which indicates the cursor line count, which is indicated as the numeral 10. This means that the visible cursor is located on line 10 of the display. All the other lines of the display have cursors which are not visible.

Returning now to FIG. 5, the specification of the cursor location in the first portion of each line in the memory is designated by the highly simplified representation in the upper left hand portion of the figure which indicates that the first of the 128 character in each line of the memory contains a specific 8-bit representation of the location on that line at which the cursor is to be displayed. If the cursor on that line is not to be displayed, the cursor location may be set to the first of the 128 characters, which is not displayed. The first of the 128 characters is of course the cursor location character. Since the cursor location character is not displayed, the cursor on the line in which the cursor location is specified to be the cursor location character does not display a cursor.

FIG. 6 also shows dotted lines running down the left hand and the right hand portion of the displayed page. These dotted lines are the ruled lines which define the area into which text can be written, that is, they define the "edge" of the page. The left hand ruled line is fixed and not changeable by the user. The vertical line which appears on each line and designates edge of the page is an ASCII character which is stored in the second of the 128 characters in the memory. Such characters are fixed and not changeable by the user. The user may therefore enter text beginning at the third of the 128th character, or set margin or tabulation facilities on the third or greater character.

FIG. 6 is the display provided on the display unit 608 according to the present invention. The first two lines of the display are fixed and unchangeable by the user. Such two lines operate under the stored program control of the system. As shown in the extreme upper left hand corner, the first character on the first line represents the page size of the display in lines. The present example indicates that the page size is 61 lines long out of a possible 64 lines. Dashes are then used throughout the rest of the line except for two margin indicies and a number of tab indicies. There are two margin indicies. The left most one defines the left hand margin and the right most one defines the right hand margin. Once such margin indicies are set by the user using the program control keys, the stored program controller automatically begins entering text on the display and in the memory in the position indicated by the margin index. The margin index itself is merely an M which appears in place of one of the last characters on the first line of the display. The right hand margin index defines the right hand most side of the page. Again once such margin index is set by the user using the program control keys, the tab indicies are used for the same purpose as the tab indicies on a typewriter. Again such tab indicies are set by pushing the appropriate tab keys shown in FIG. 7 which causes the stored program controller to insert the letter t in place of one of the dashed lines on the first line of the display to indicate the position at which the tab is set. The second line of the display indicates the position of the characters on the display in each line. Such a representation is variable because either 10 characters to the inch or 12 characters to the inch may be used by the typist and such character positions will therefore adjust to the pitch set by the user. Again such pitch is indicated by function key 8 indicated in FIG. 7. By pressing such keys, the stored program is accessed to change the pitch of the characters in the text.

The first character of the second line of the display is the cursor line count which was described above. The remaining characters are dashed lines and intervals of 10, 20, 30 and so on spaces for designating the character position. The important point about the margin indices is that a specific protected area is set up by the stored program controller into which text cannot be written. This is achieved by automatically inserting a predetermined number of blank characters into each line of memory corresponding to the number of characters in which the left hand margin is indented from the left edge of the page thus each line of the memory is divided into five data portions. The first portion shown in FIG. 5 specifies the location of the cursor. The immediately adjacent second portion is the character which represents the vertical line or ruled line which defines the left hand edge of the page. The characters adjacent thereto form a third portion of each line of the memory which defines a protected area into which text cannot be written by the user. Such blank characters constitute a pedetermined number of character positions in memory directly adjacent to the vertical line second portion of memory. Following the third predetermined portion of the memory is a clear area of memory into which and from which text can be written by the user with a keyboard. The text forms this fourth portion of each line of memory. Finally, a fifth portion of each line of memory defines the right hand most margin. The right hand most margin is designated by a vertical line which is represented by an ASCII character in the specific position of 128 characters in each line of memory at which the margin is set. Any characters to the right or increasing bits significance of the 128 characters in the line are filled with blanks and form a protected area into which and from which characters cannot be written by the user. The stored program controller thus provides means for providing a text area and a protected area in memory and correspondingly on the display. Such a protected area may be enforced by means of a program instruction in the system program for the stored program controller or by hardware. The implementation of such a protected area is therefore relatively straightforward. The user moves the cursor position to indicate the point at which text is to be read or to be written. As soon as the cursor reaches the margin point the cursor movement circuit is automatically disabled. This may be ahieved by a comparator which compares the location of the cursor to the location of the margin in each line. If the cursor location and the margin index line match, the instructions or circuitry for moving the cursor to the right of the right hand margin or to the left of the left hand margin are circumvented or disabled. In the case of software, a branch instruction is used to avoid execution of instructions for moving the cursor to the left of the left hand margin. In a hardward implementation a gate would be used to prevent such means to provide a predetermined area of space on the display into which the user can frame the text. Justification if desired may also be performed within the predetermined region. The defining of such predetermined regions on a display and in memory for use in interaction with other IO devices is believed to be significant improvement in the art of text editing systems since it automatically provides the user with a visual indication of the work space in which he may operate and automatically prevents operation outside of such work space. Furthermore, by visually displaying the work space outlined by dotted lines on a CRT screen, the user may visualize the extent of the work space and be able to plan and compose the text more efficiently.

Another key feature of the invention is the independence of the data manipulation and the display. The data manipulation such as justification is performed by the processor by direct interaction with the video display memory. The display itself is performed by a separate and discrete video display board shown in block diagram form in figure form which abstracts one line at a time from the memory along the data bus 601 which is stored in the one line shift registers 629. Such transfer is performed by the direct memory access one line at a time in synchronization with the scanning beam of the CRT, and independent of video display function and processing functions.

Figure 7:
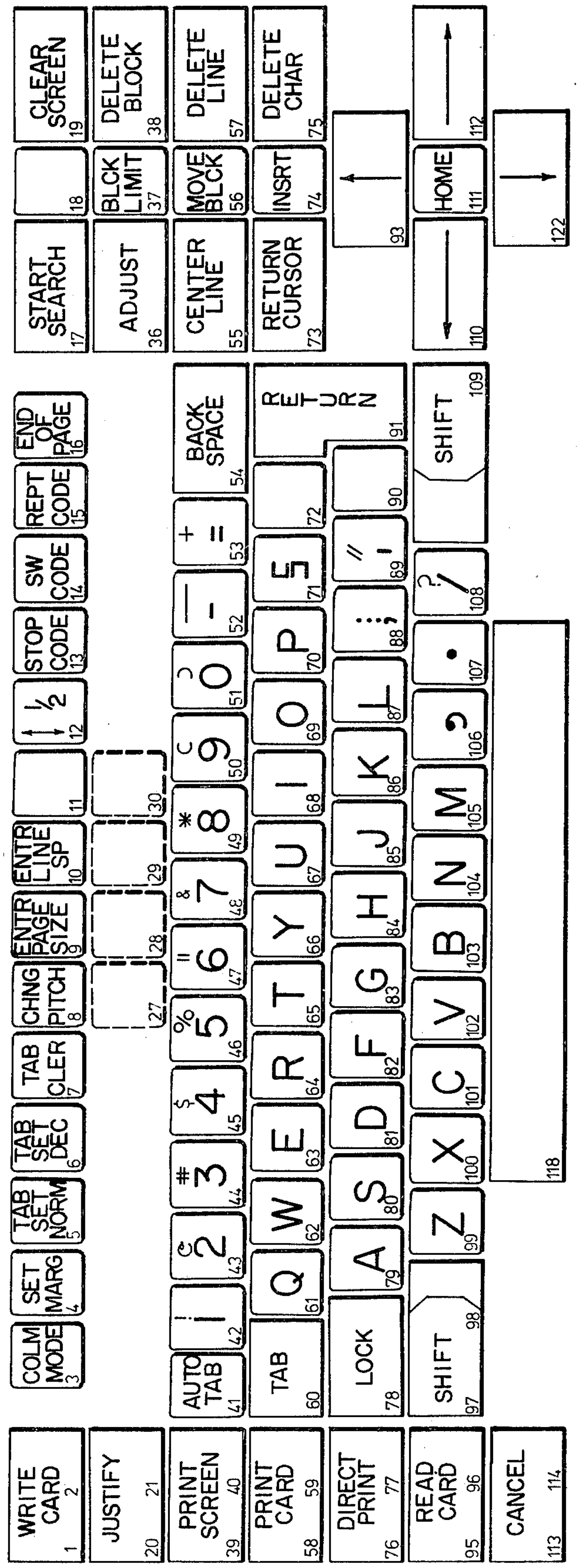
FIG. 7 is a pictoral representation of the keyboard used in an editing display system according to the present invention.

FIG. 7 is a diagram of the keyboard 609 of the present invention. The keyboard is meant to illustrate the various stored program control functions that may be implemented with the present invention by means of keys which are accessible to the user and which may be implemented by merely pressing. Some of these specific function keys have already been discussed, for example key 4 for setting the margin, key 5 for setting the tab and key 8 for changing the pitch. The other function keys such as 20 justify or searching key 17 are performed by software in the stored program controller, and a such need not be described in more detail here. It is merely important to note that a wide variety of specialized text editing and processing functions can be performed using the memory partition and processing according to the present invention.

I claim:

1. A microprogrammable text editing and display system comprising:

a microprogrammable controller;

a clock source;

instruction sequencer means for sequentially controlling a plurality of controller operations;

program counting means for counting program steps, said program counting means including means for storing program steps;

instruction register means for storing an instruction word;

decoder means for decoding the operation called for in the instruction stored in said instruction register;

said sequencer means including a control read-only memory having an output for generating a group of sequentially controlled signals;

means coupling said decoder means to said output of said control read-only memory dependent upon the operation called for by the instruction in said instruction register;

accumulator means;

memory means;

input-output control means for coupling data from peripheral circuitry to said controller;

bus means having input means coupled to the outputs of said instruction register, said program counter and said memory means, said accumulator means and said input-output control means;

said bus means including output means and multiplexer means for selecting the input to be passed to the output means of said bus means;

means coupling said instruction sequencer to said bus means multiplexer for selecting the input to be passed by the output of said common bus means;

means coupled to said instruction sequencer means for selectively coupling the output of said bus means to one of said memory means, said accumulator means, said instruction register means, program counter means, said accumulator means and said input-output control means selectively in accordance with the sequential control signal developed by said control read-only memory;

an address register connected to said input means of said bus means for specifying a predetermined location in said memory means;

said text editing and display system further comprising:

a random access memory;

means for storing characters pertaining to a predetermined line to be displayed in a predetermined portion of said random access memory;

means for storing a cursor location pertaining to said predetermined line a a predetermined portion of said random access memory;

means for providing access to said random access memory for reading out said stored characters and said cursor location;

a display unit connected to said means for providing access, and having a display for displaying said stored characters along lines on said display;

means connected to said means for providing access for generating at least two visible markers in predetermined locations on said display corresponding to said stored cursor location;

means for generating variable margin and tab indices on said display;

at least one of said visible markers being displayed on one of said row lines of said display where said tab indices are displayed;

the line count of said predetermined line storing one of said cursor locations being displayed on said display;

said display means having a plurality of character row lines in which images of data characters may be displayed, each of the character rows including a right-hand border character and a left-hand border character;

video control means connected to said display means for supplying signals representing characters to be displayed in said character rows, including means for generating a cursor on each of said character rows;

means for storing representations of all characters to be displayed on one line including a representation of where a cursor is to be displayed on said one line; and said random access memory partitioned into data sets corresponding to each line of said display, each data set being partitioned into first, second, third, fourth and fifth data portions; said first portion representing the location on that line where a cursor is to be activated; said second portion being a character representing a vertical rule line to be displayed on the left-hand portion of the display line to be displayed on the left-hand portion of the display; said third portion being a region of said line where blank characters may be introduced to define a specific margin point, said fourth portion being a region of said line wherein text entered by the user for display may be introduced, said fifth portion being a character representing a vertical rule line to be displayed on the right-hand portion of the display.

2. An editing display system as defined in claim 1, further comprising a keyboard for producing representations of a plurality of characters, the images of which are to be displayed in character rows on said display means; and processor means connected to said keyboard and said random access memory for transferring said representations of characters from said keyboard to said fourth portion of a predetermined one of said data sets of said random access memory.

3. An editing display system as defined in claim 2, wherein said processor means includes means for defining a specific protected area in said random access memory into which representations of characters produced by said keyboard cannot be entered.

4. An editing display system as defined in claim 3, further comprising data and address busses interconnecting said random access memory, said processor means, said video control means, and said keyboard for transferring data and address information respectively therebetween.

* * * * *